Aug. 14, 1945.　　　C. C. BARBER　　　2,382,846

DIFFERENTIAL GEARING

Filed July 3, 1943　　　2 Sheets-Sheet 1

INVENTOR
C. C. BARBER
BY
ATTORNEY

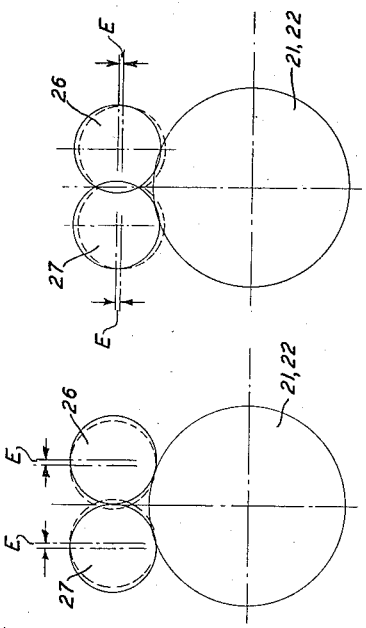
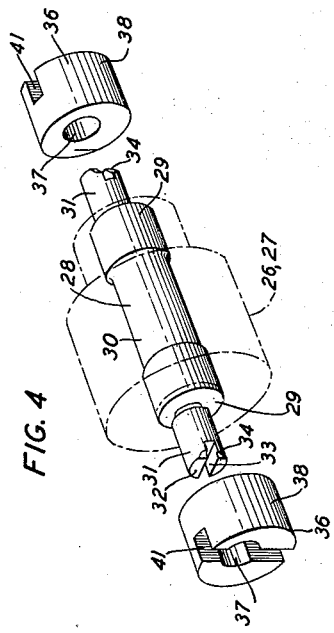
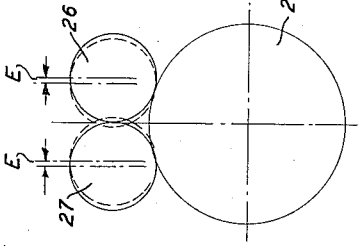
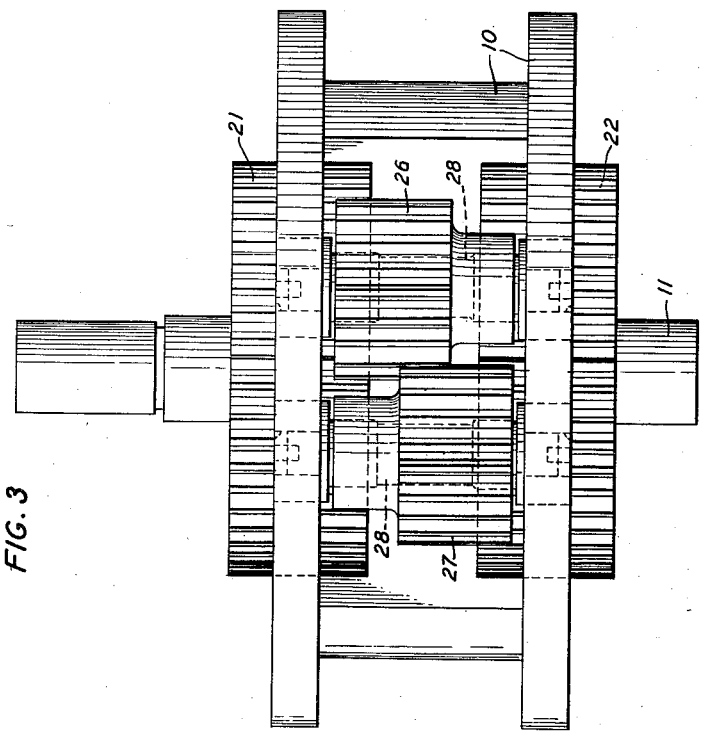

Patented Aug. 14, 1945

2,382,846

UNITED STATES PATENT OFFICE 2,382,846

DIFFERENTIAL GEARING

Charles C. Barber, Rockville Centre, N. Y., assignor to Bell Telephone Laboratories, Incorporated, New York, N. Y., a corporation of New York Application July 3, 1943, Serial No. 493,381

9 Claims. (Cl. 74—306)

This invention relates to differential gearing arrangements and particularly to means for reducing backlash among the gears thereof.

An object of the invention is to provide a gear train wherein backlash is maintained within a desired minimum range by adjusting the distance between centers of meshed gears.

Another object of the invention is to provide a simplified differential gear train in which backlash is substantially eliminated between the planetary pinions and also between each planetary pinion and its associated sun gear.

Still another object of the invention is to provide a differential gear train with improved planetary pinion supporting means for eliminating backlash between the planetary pinions and also between each planetary pinion and its associated sun gear.

In arrangements for the accurate control of gun fire, such as fire directors wherein gear mechanisms are important adjuncts, it is necessary that backlash be eliminated entirely or held within narrow limits by positive means, the use of yielding means being objectionable because of the introduction of vibration and chatter. This backlash elimination can be accomplished by the manufacture and assembly of precision type gears, which obviously are quite expensive, or by the disposition of the axes of the gears nearer to each other or further apart so that the teeth thereof enter more or less into engagement with each other.

General arrangements of the above type having adjustable gear centers are well known, as well as the arrangements in which flexible means are employed, but the known arrangements are complicated, require a substantial amount of space, and do not satisfactorily eliminate backlash.

According to a feature of the present invention advantages are obtained over the prior arrangements for eliminating backlash in gear trains by mounting each planetary pinion on an eccentric bushing and eccentric pinion shaft combination. Adjustment of the eccentric bushings minimizes backlash between the meshed pinions by reducing the distances between the centers of the pinions while adjustment of the eccentric pinion shafts similarly reduces backlash between each pinion and its associated sun gear.

According to a further feature of the invention the adjustment of backlash between each planetary pinion and its associated sun gear can be accomplished with minimum disturbance to the previous backlash adjustment between the planetary pinions.

According to a still further feature of the invention the eccentric bushings and eccentric shafts are so designed that readjustments of backlash, necessitated by wear of the gear teeth, can be readily made.

These and other features of the invention will be more fully described in the following specification, taken in connection with the accompanying drawings in which:

Fig. 3 is a top plan view of the gear assembly;

Fig. 4 is an exploded perspective view of the eccentric bushing and eccentric shaft combination;

Fig. 5 is a diagrammatic view illustrating the eccentricity provided for the planetary pinions; and Fig. 6 is a diagrammatic view illustrating the eccentricity provided for each planetary pinion and its associated sun gear.

Figure 2:
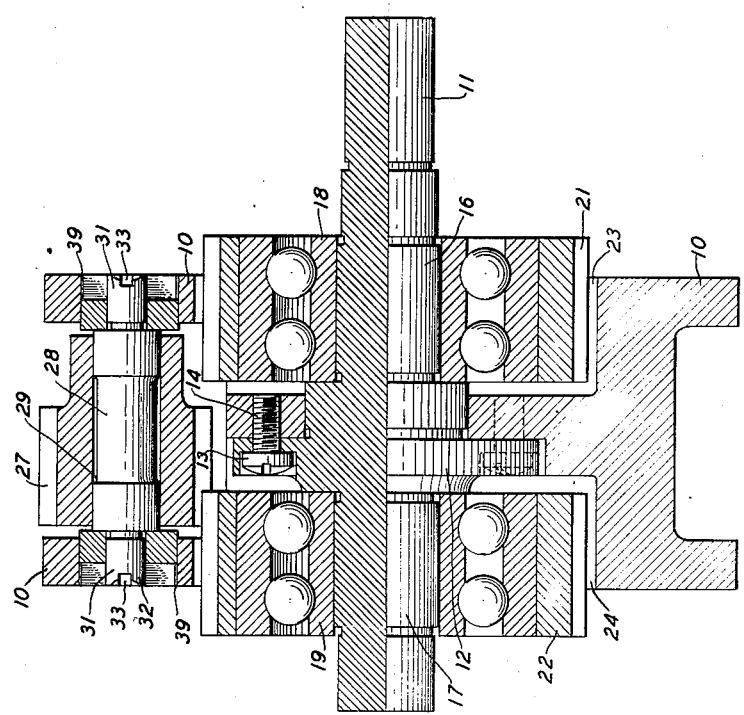
Fig. 2 is a sectional view taken along line 2—2 of Fig. 1.
Figure 1:
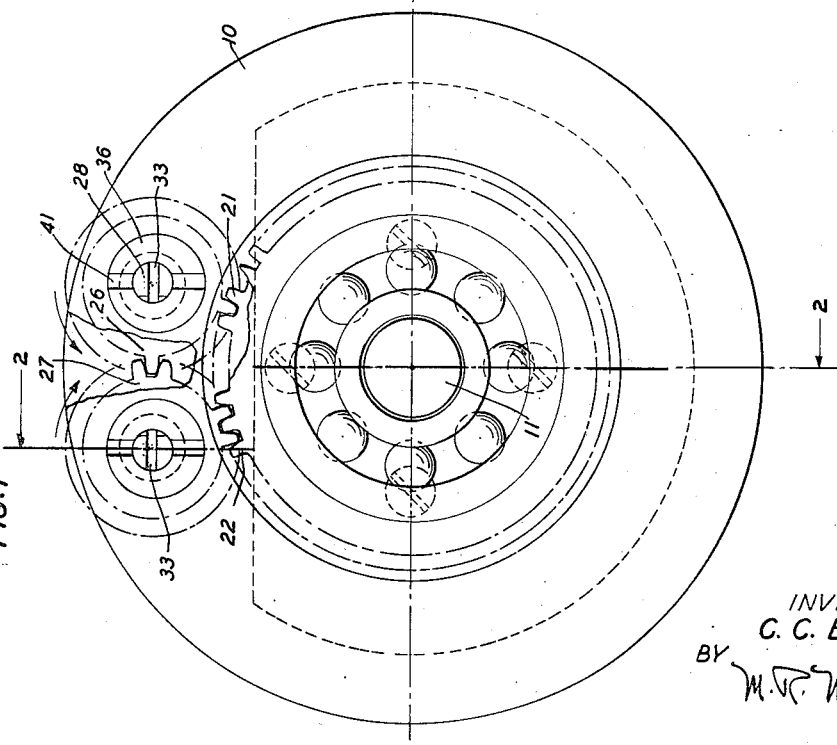
Fig. 1 is an end view of the gear assembly.

Referring now to the drawings and particularly to Figs. 1, 2, and 3, there is shown a planetary gear assembly which comprises a spider 10 for supporting the various shafts and gears; a sun gear shaft 11 having a shoulder 12, preferably integral therewith, secured to spider 10 by screws 13 spaced circumferentially around shoulder 12 and adapted to engage threaded apertures 14 in spider 10, so that spider 10 and shaft 11 will rotate as a single unit. Bearing surfaces 16, 17 of shaft 11 have frictionally secured thereto inner surfaces of ball bearing units 18, 19, respectively, while the outer surfaces of ball bearing units 18, 19 are frictionally secured to sun gears 21, 22, respectively, which as a result rotate freely around shaft 11. Sun gears 21, 22 are of such width as to be disposed both within openings 23, 24, respectively, and beyond the sides of spider 10 for engagement with external cooperating gears (not shown).

Sun gears 21, 22 mesh with planetary pinions 26, 27, respectively, which are rotatably supported by individual shafts 28 having intermediate pinion bearing surfaces 29 eccentric with the axis of each of said shafts (see Fig. 4). While the intermediate bearing portions 29 of shaft 28 have been shown for purposes of mechanical expediency as comprising two bearings separated by an undercut middle portion 30, it is, of course, understandable that the bearing portions 29 may, instead, be continuous. The end bearing portions 31 of each pinion shaft are concentric with the axis thereof while the shaft ends 32 are provided with slots 33 to facilitate adjustment of the pinions 26, 27 relative to each other. In addition, chamfers 34 are cut at the shaft ends 32 to indicate the direction in which the eccentricity of the bearing surface 29 is maximum with respect to the axis thereof.

Each pinion shaft 28 is supported by a pair of eccentric bushings 36 having inner apertures 37 for bearing engagement with end bearing portions 31 and having outer bearing surfaces 38 for disposition in openings 39 provided in the spider 10 (see Fig. 2). Bushings 36 are also provided with slots 41, which may be cut in the direction of maximum-minimum eccentricity, to facilitate adjustment of the pinion and associated sun gear centers. Since a pair of bushings 36 is required for the support of each pinion shaft 28 and since each bushing 36 is independently mounted in apertures 39 of spider 10, it is necessary that the eccentric portions of both bushings 36 be coincident. This may be accomplished by adjusting the bushings 36 by means of a U shaped tool (not shown) having inwardly facing screw driver ends for engagement with slots 41.

The outer bearing surface 38 of bushing 36 is concentric with spider opening 39 while the inner aperture 37 thereof is eccentric with spider opening 39 and at the same time concentric with respect to end bearing portion 31 of the pinion shaft 28, the end bearing portion 31, as mentioned hereinbefore, being concentric in turn with pinion shaft 28. Thus it is seen that rotation of each pair of bushings 36 will carry its associated pinion shaft 28 including, say pinion 27, either toward or away from the other pinion shaft 28 including pinion 26; while rotation of the pinion shaft 28 itself, in view of the eccentricity of intermediate bearing portions 29 with respect to pinion shaft 28 and end bearing portion 31, will carry the pinion toward or away from its associated sun gear. This is exemplified diagrammatically in Figs. 5 and 6, wherein the displacement of Fig. 5, as represented by the distance between the full and dotted circles, is produced by the eccentricity E of bushings 36 for eliminating backlash between pinions 26 and 27 and wherein the displacement of Fig. 6, as represented by the distance between the full and dotted circles, is produced by the eccentricity E of the pinion shaft intermediate bearing portions 29 for eliminating backlash between pinion 26 and its associated sun gear 21 and between pinion 27 and its associated sun gear 22. It is to be noted that the backlash adjusting procedure is performed in two successive stages, the first stage as exemplified by Fig. 5, wherein the bushings 36 are adjusted and locked in position; and the second stage, as exemplified by Fig. 6, wherein the shafts 28 are then adjusted and locked in position, as will be described hereinafter in greater detail.

Material advantages are obtained through this invention by the use of ordinary gears, as against precision gears, particularly in view of the wider tolerances that may be permissible between gear centers. The various gears may be assembled in position with slots 33 and 41 of the pinion shafts 28 and bushings 36, respectively, oriented as shown in Fig. 1. With this setting of the bushings 36 and pinion shafts 28, pinions 26 and 27 are initially coupled loosely by amply spacing the pinion centers and as a result have a certain amount of backlash therebetween, thereby enabling the use of ordinary gears. To reduce the spacing of the pinion centers bushings 36 of both pinions 26 and 27 are rotated by the U shaped tool, mentioned hereinbefore, in the direction of the arrows at the top of Fig. 1. Rotation of eccentric bushings 36, clockwise in the case of pinion 27 and counterclockwise in the case of pinion 26, reduces the centers between the pinions 26 and 27 by carrying the pinion shafts 28 towards each other, as explained hereinbefore, and causes the teeth thereof to mesh closer and closer until very little backlash, if any, is present therebetween. After the optimum mesh between the teeth of pinions 26 and 27 is obtained, the bushings 36 are secured in position by staking or by any other suitable means.

The backlash existing between the pinions 26 and 27 having been removed the next step is to remove the backlash between each pinion and its associated sun gear without substantially affecting the backlash adjustment already made between pinions 26 and 27. Taking pinion 26 and sun gear 21 first, the backlash therebetween is removed by rotating pinion shaft 28 counterclockwise (in the direction of the arrow) by means of a screw driver (not shown) inserted in slot 33. Rotation of the pinion shaft 28, as explained hereinbefore, correspondingly rotates the eccentric intermediate bearing portion 29, which carries the pinion 26 towards the sun gear 21, thereby reducing the centers therebetween, until the teeth of pinion 26 and sun gear 21 are at optimum mesh with minimum backlash. The backlash between pinion 27 and associated sun gear 22 is next removed by a similar adjusting procedure the companion pinion shaft 28, however, being rotated clockwise in this instance.

Following removal of backlash between the pinions and the associated sun gears, both pinion shafts 28 are secured in position by any suitable means, as, for instance, by slightly staking metal into the bushing and shaft slots 41 and 33, respectively. It is to be noted that the two adjusting steps, namely, the backlash adjustment between the pinions 26 and 27 and the backlash adjustment between each pinion and its associated sun gear, are substantially independent of each other in so far as one adjustment may tend to disturb the other adjustment. Of course, a slight readjustment of the bushings 36 might be required in some extreme instances but it has been found in practice that when such readjustments are required they are of very minute character.

Later readjustments of bushings 36 and shafts 28 may be required in order to take up further backlash brought about by wear of the gear teeth. These readjustments may be made by first removing the securing means by which bushings 36 and shafts 28 are locked into position, then readjusting said bushings and shafts, as hereinbefore explained, and finally relocking them in their new positions. If staking has been employed as the securing means, removal thereof may readily be accomplished by applying a force, somewhat in excess of that normally encountered while in use, sufficient to overcome the initial staking.

It is apparent that actuating forces may be applied to the differential gear mechanism in several ways. For example, in one of the uses to which the herein differential may be employed, the driving force is applied to sun gear shaft 11, which is rotatably mounted upon separate bearings (not shown), the rotation resulting therefrom carrying spider 10 and planetary pinions 26, 27 about the axis of said shaft, pinions 26, 27 also being adapted to rotate about their own axes, whereupon the sun gears 21, 22 are independently rotated in opposite directions about the axis of shaft 11. It is also apparent that notwithstanding the point at which or the direction in which the actuating force is applied, backlash will be effectively eliminated throughout the entire gear train.

Although the invention has been described in connection with a specific embodiment, the principles involved are susceptible of numerous other applications, which will readily occur to persons skilled in the art. For example, one pair of adjustable eccentric bushings 36, instead of two pairs, may be employed for removing backlash between the planetary pinions 26, 27, the remaining pair of bushings being concentric. The invention is, therefore, to be limited only as indicated by the scope of the appended claims.

What is claimed is:

1. A differential gear system comprising, in combination, a rotatable support, a pair of intermeshed pinions carried by said support and adapted for rotation about their own axes, a pair of spaced gears each of which is disposed in mesh relation with an associated one of said pinions, eccentric means for preventing backlash between said intermeshed pinions, and second eccentric means for preventing backlash between each pinion and its associated gear.

2. A differential gear system comprising, in combination, a spider, a pair of planetary pinions carried by said spider, said pinions being in mesh relation with each other, a pair of sun gears rotatably supported by said spider, each of said sun gears meshing with an associated one of said planetary pinions, eccentric means for reducing backlash between said pinions, and further eccentric means for reducing backlash between each planetary pinion and its associated sun gear, the backlash reduction produced by said first-mentioned means being substantially undisturbed by said second-mentioned means.

3. A differential gear mechanism comprising, in combination, a rotatable spider, a pair of intermeshed pinions carried by said spider, a pair of gears rotatably supported by said spider, each of said gears being in mesh relationship with an associated one of said pinions, eccentric means embedded in said spider for reducing backlash between said pinions, and adjustable eccentric means for reducing backlash between each gear and its associated pinion, the first-mentioned means being substantially unaffected by adjustment of the second-mentioned means.

4. A differential gear mechanism comprising, in combination, a shaft, a spider affixed to said shaft and rotatable therewith, a pair of spaced sun gears rotatably mounted on said shaft, a pair of intermeshed pinions, carried by said spider, said pinions being adapted to rotate about their own axes and also being adapted to rotate about the axis of said shaft, each of said sun gears being meshed with an associated one of said pinions, eccentric means disposed in said spider for eliminating backlash between said pinions, and adjustable eccentric shafts disposed in said eccentric means for eliminating backlash between each sun gear and its associated pinions, said eccentric means being substantially unaffected by the adjustment of said eccentric shaft.

5. A differential gear mechanism comprising, in combination, a driving shaft, a spider affixed to said shaft and rotatable therewith, a pair of spaced gears freely mounted on said shaft, a pair of intermeshed pinions supported by said spider, said pinions rotatable about their own axes and also rotatable about said shaft, each of said pinions being in mesh relationship with an associated one of said gears, adjustable eccentric bushings disposed in said spider for preventing backlash between said pinions, and adjustable eccentric shafts disposed in said eccentric bushings for preventing backlash between each pinion and its associated gear, the adjustment of said bushings being substantially unaffected by the adjustment of said eccentric shafts.

6. A differential gear mechanism comprising, in combination, a driving shaft, a spider affixed to said shaft and rotatable therewith, said spider having a plurality of oppositely spaced openings, a pair of spur gears freely mounted on said shaft, a pair of intermeshed pinions supported by said spider, said pinions being rotatable about their own axes and also being rotatable about said shaft, each of said pinions being in mesh relationship with an associated one of said spur gears, a pair of adjustable eccentric bushings disposed in a pair of said spider openings for preventing backlash between said pinions, a pair of concentric bushings disposed in another pair of said spider openings, and adjustable eccentric shafts disposed in said eccentric and concentric bushings, respectively, for preventing backlash between each pinion and its associated spur gear, the adjustment of said bushings being substantially unaffected by the adjustment of said eccentric shafts.

7. In a differential gearing mechanism of the character described, in combination, a spider, planetary pinions carried by said spider, said pinions meshing with each other, a shaft secured to said spider and rotatable therewith, freely rotatable spur gears mounted in spaced relationship on said shaft, said gears being in mesh relationship with said pinions, rotatable means for reducing backlash between the pinions, and rotatable means for reducing backlash between the pinions and the gears, the first-mentioned means being substantially unaffected by rotation of the second-mentioned means.

8. In a differential gearing mechanism of the character described, in combination, a spider having opposite openings eccentrically arranged sleeves mounted on said openings, transverse shafts carried by said sleeves, end portions of said shaft concentric with the axis thereof and disposed within said eccentric sleeves, eccentric intermediate bearing portions on said shaft, a pair of pinions rotatably mounted on the intermediate bearing portions of a pair of said shafts, said pinions meshing with each other, and a pair of spur gears in mesh relationship with said pinions.

9. In a differential gearing mechanism of the character described, in combination, a spider having opposite openings, bushings mounted in said openings, said bushings having eccentric apertures and having slots for adjusting purposes, a plurality of pinion shafts, concentric end portions of said shafts for disposition in said eccentric apertures, said end portions having transverse slots for adjusting purposes, eccentric intermediate bearing portions of said shafts, planetary pinions rotatably mounted on said intermediate bearing portions and in mesh relationship with each other, a sun gear shaft secured to said spider, and spaced sun gears rotatably mounted on said sun gear shaft, each of said sun gears being in mesh relationship with an associated one of said planetary pinions, said eccentric bushings being adjustable to vary the centers between the meshed planetary pinions, and said eccentric intermediate bearing portions being adjustable to vary the centers between each sun gear and its associated planetary pinion.

CHARLES C. BARBER.